United States Patent Office 3,625,082
Patented Dec. 7, 1971

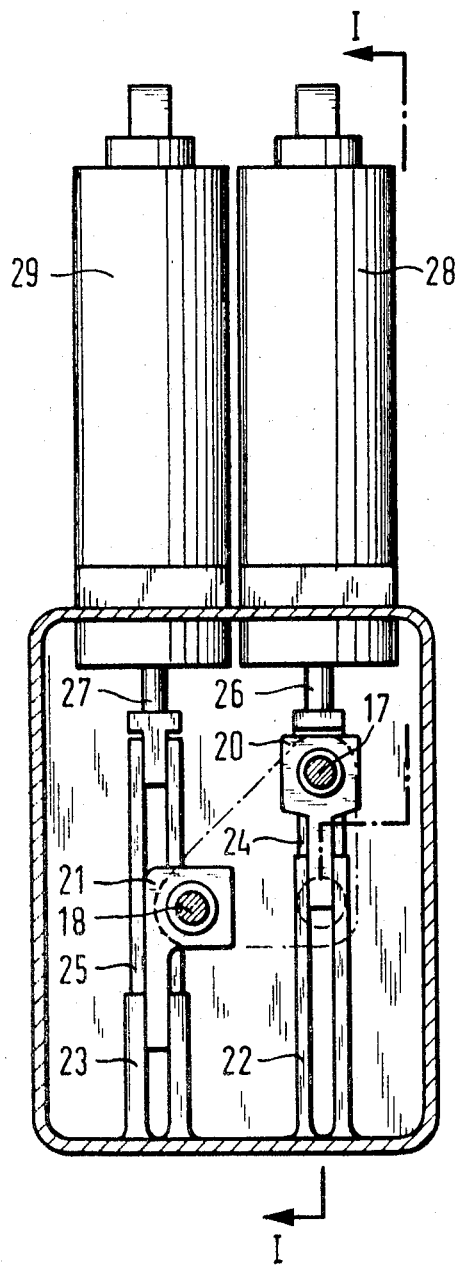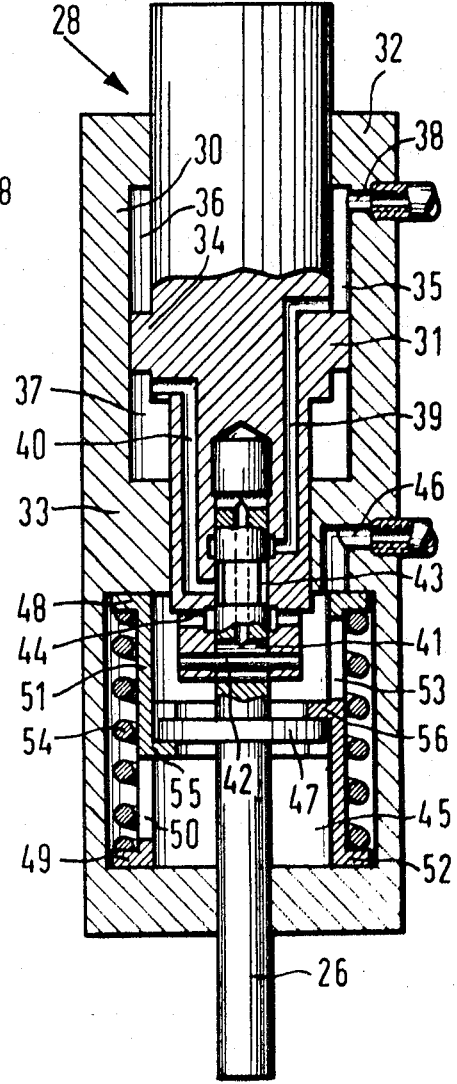

3,625,082
CONTROL MECHANISM FOR A DUAL SERVO ARRANGEMENT
Rudolf-Erich Muller, 12 Reichenbacher Strasse, 8732 Munnerstadt, Germany, and Karl Schorn, deceased, late of Dusseldorf, Germany
Filed Jan. 27, 1970, Ser. No. 6,064
Claims priority, application Germany, Feb. 4, 1969, P 19 05 428.5
(Filed under Rule 47(a) and 35 U.S.C. 116)
Int. Cl. G05g 9/04
U.S. Cl. 74—471 XY                    13 Claims

ABSTRACT OF THE DISCLOSURE

Two hydraulic actuators of a servo mechanism are independently controlled by pivoting movements of the same control stick in two perpendicular planes. The stick is mounted on a universal joint and carries two additional universal joints on radial arms offset 90° about the stick axis and equidistant from the same, and linkages connecting the additional joints to the actuators respectively are equipped with biasing arrangements for returning the stick to the neutral position and may be equipped with magnets for holding the stick in a desired position angularly offset from the neutral position.

---

This invention relates to servo controls, and particularly to an arrangement for simultaneously and independently controlling movements of two motion transmitting elements.

Servo mechanisms have been employed heretofore for moving heavy work pieces on machine tools in two rectilinear paths at right angles to each other when an operator moves control elements with little effort. The known devices require separate control elements to be moved to achieve displacement of the work piece in two directions transverse to each other. The necessary coordination of the two control movements for reaching a desired position of the work piece is difficult to achieve even to otherwise skillful persons.

The primary object of the invention is the provision of a control mechanism for a dual servo mechanism of the type described above which permits movement of a work piece in two dimensions to be controlled by moving a single control element.

With this object and others in view, as will hereinafter become apparent, the invention provides a single control element connected to supporting structure by a first universal joint for universal angular movement which includes movement in each of two intersecting planes toward and away from a neutral position. Two arms which are mounted on the control member extend from the same transversely of the respective planes. A second and a third universal joint are mounted on the arms respectively. Two servo actuators which cause movements of respective motion transmitting trains are respectively connected to the second and third universal joints by linkages for controlling the actuators in response to movement of the arms.

Other features, additional objects and many of the attendant advantages of this invention will readily become apparent from the following detailed description of a preferred embodiment and of modifications thereof when considered in connection with the appended drawing in which:

FIG. 2 illustrates the apparatus of FIG. 1 in front-elevational section on the line II—II;

FIG. 3 shows one of the servo actuators of the apparatus in elevational section on its axis on a scale larger than that of FIGS. 1 and 2.

Figure 1:
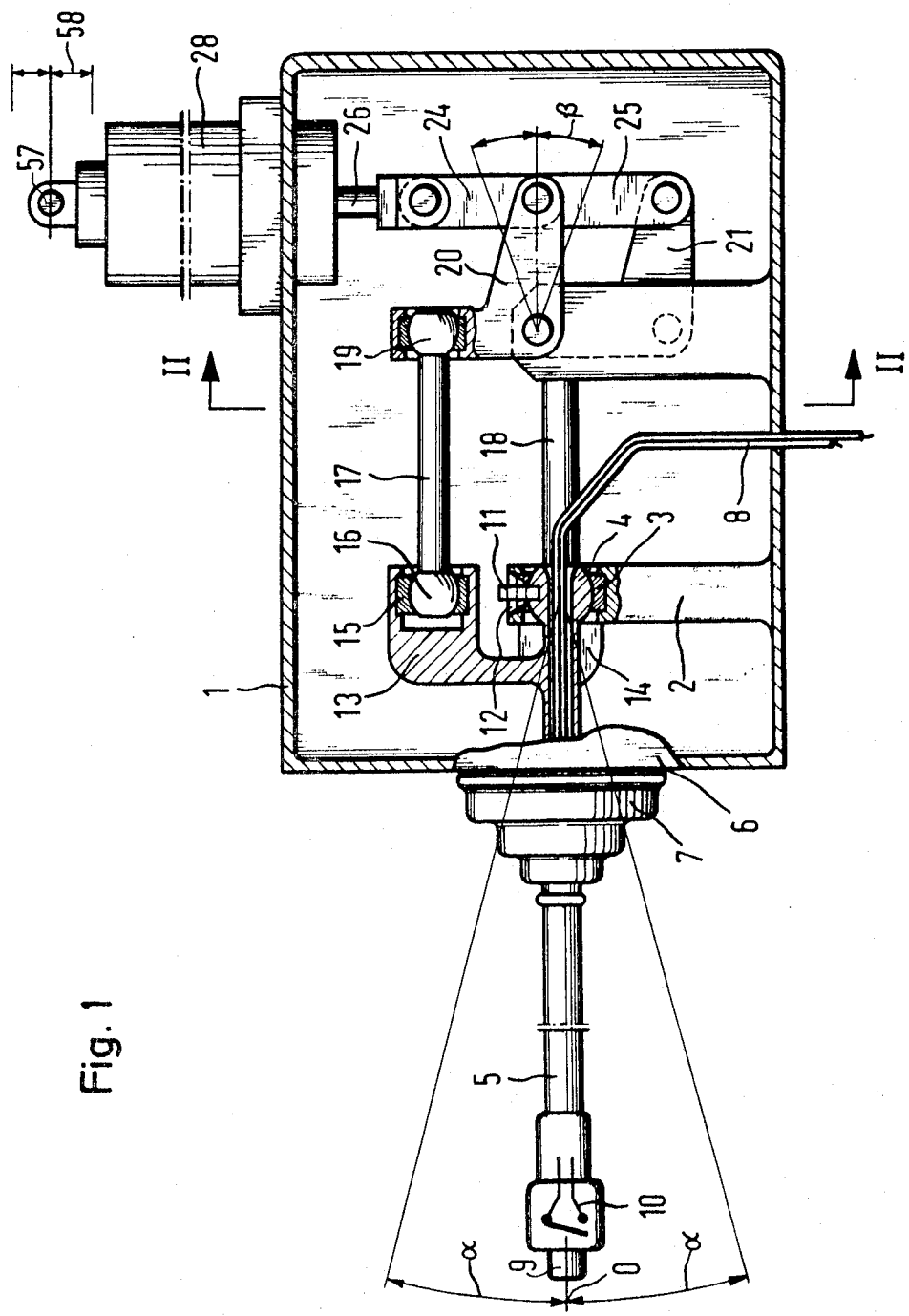
FIG. 1 shows a control mechanism of the invention and portions of the associated servo mechanism in side elevation and partly in section on the line I—I in FIG. 2.

Referring now to the drawing in detail, and initially to FIG. 1, there is seen a rectangular casing which supports all other illustrated elements. A fixed column 2 in the casing cavity carries the socket member 3 of a first universal joint of the ball-and-socket type, the ball member 4 of the joint being integral with one end of a tubular control stick 5 whose longitudinal axis passes through the center of rotation of the joint. The control stick 5 passes through a circular opening 6 in the casing 1 of sufficient size to permit the stick to swing in an angle α from the illustrated neutral position in all directions. A rubber boot 7 seals the opening 6 without interferring with stick movement. Two conductors 8, whose function will presently become apparent, pass through the stick 5 to a normally open switch 10 at the outer end of the stick 5. The switch may be closed against the restraint of a non-illustrated spring by axially depressing a button 9 at the free end of the stick. Rotation of the stick 5 about its longitudinal axis is prevented by a pin 11 which radially projects from the ball member 4 into an elongated slot 12 in the socket member 3.

The control stick 5 carries two identical arms 13, 14 of which only one is seen in detail in FIG. 1. The arm extends radially from the stick and carries at its end the socket member 15 of a second universal joint whose ball member 16 constitutes one end of a linking rod 17. A third universal joint, not seen in FIG. 1, connects the arm 14 to another linking rod 18, the arrangement being such that the centers of rotation of the three joints are located in a common plane radial to the stick axis, the centers of the joints at the free ends of the arms 13, 14 being equidistant from the center of the ball member 4.

A ball member 19 which constitutes the end of the rod 17 remote from the arm 13 engages a mating socket in one arm of a bell-crank lever 20 pivoted on a slotted bracket 22 in the casing 1, as better seen in FIG. 2. A bellcrank lever 21 is similarly mounted on a bracket 23, and one of its arms is hingedly connected to the linking rod 18 by a universal joint. A pair of flat linking bars 24 hingedly connect the lever 20 to the control rod 26 of a hydraulic actuator 28, and linking bars 25 similarly connect the lever 21 to the control rod 27 of another actuator 29 identical with the actuator 28.

As is indicated in chain-dotted phantom view in FIG. 2, the two arms 13, 14 are integrally connected by a triangular web so as to maintain the desired spatial relationship of the three universal joints on the control stick 5.

The internal structure of the actuator 28 is shown in FIG. 3. It has a generally cylindrical, upright, outer shell 30 fixedly mounted in an opening of the casing 1 so as to constitute a portion of the stationary support structure. The cavity of the shell 30 is axially divided into two compartments 35, 45 by an internal flange 33 on the shell. The compartments 35, 45 are axially bounded by apertured radial end walls 32 of the shell 30. The control rod 26 is longitudinally guided in the aperture of the lower end wall and a piston or plunger 31 of stepped cylindrical shape is movably sealed in the aperture of the upper end wall and in the flange 33.

A collar 34 on the piston 31 axially separates two annular chambers 36, 37 in the compartment 35 from each other. A port 38 in the shell 30 connects the upper chamber 36 with a pump or other source of hydraulic fluid, not shown in detail. Ducts 39, 40 in the body of the piston 31 lead from the chambers 36, 37 to a blind axial bore in the lower piston portion in which the control rod 26 is slidably received. The rod is attached to the piston by a transverse pin 42 fixedly attached to the piston and passing through an axially oversized slot 41 in the rod 26 so as to permit limited relative movement of the piston and rod in an axial dimension.

Depending on the axial position of the rod 26 in the piston 31, a wide circumferential groove 43 in the rod 26 may connect the orifices of the ducts 39, 40 or connect the duct 40 with a radial bore 44 in the piston which leads into the compartment 45. A return port 46 connects the compartment 45 with the intake of the afore-mentioned pump or an associated pump.

The control rod 26 carries a fixed, radial flange or collar 47 which is axially centered in the chamber 45 in the illustrated neutral position of the rod 26 in which the groove 43 communicates with the duct 40 only.

The flange 33 and the lower end wall 32 provide fixed abutments for two identical spring retainers 51, 52 of generally cylindrical shape coaxially arranged in the compartment 45. External radial flanges 48, 49 on the retainers provide movable abutments for a helical compression spring 54 which envelops the retainers. Axial slots 50, 53 in each retainer are slidably engaged by claw-shaped portions 55, 56 of the other retainer, the collar 47 being arranged between the claw portions 55, 56 so as to limit its axial movement away from the associated movable abutments 48, 49.

The piston 31 projects upwardly from the upper end wall 32 of the shell 30 in all operative positions of the actuator 28, and the projecting piston portion has a lug 57 (FIG. 1) fixedly attached thereto. The internal structure of the actuator 29 is as shown in FIG. 3, and the piston of the actuator carries an apertured lug. The lugs are elements of respective motion transmitting trains, not otherwise shown, which connect the actuator pistons with a carriage movable in a first straight path and with a slide movable on the carriage in a second path at right angles to the first path, the slide being equipped to carry a work piece to be machined, as is conventional in itself and not shown in the drawing.

When the control stick 5 is swung clockwise or counterclockwise through the angle α as shown in FIG. 1, the bellcrank lever 20 swings through the angle β in the same direction, thereby shifting the control rod 26 longitudinally in the shell 30. When the stick 5 is swung upwardly or clockwise, the control rod 26 moves downwardly or outwardly of the shell 30. The downwardly moving collar 47 pulls the spring retainer 51 downwardly against the restraint of the spring 54, and the rod 26 moves in the initially stationary piston 31 until the groove 43 connects the conduit 40 to the bore 44 so that the chamber 37 is vented through the return port 46. Fluid entering the chamber 36 from the port 38 under high pressure pushes the piston 31 downwardly and correspondingly moves the motion transmitting train represented in the drawing by the lug 57. After the piston has been moved a distance 58 (FIG. 1), the relative position of the piston and of the control rod illustrated in FIG. 1 is restored, the two chambers 36, 37 are sealed and the piston stops.

When the control stick 5 is thereafter released, the rod 26 is moved upwardly in the still stationary piston 31 by the compressed spring 54, the groove 43 connects the ducts 39, 40, and pressure fluid from the chamber 36 and the port 38 enters the chamber 37. The effective radial face of the piston 31 in the chamber 37 is approximately twice the size of the corresponding piston face in the chamber 36, and the piston 31 is moved upwardly by hydraulic pressure, taking the lug 57 and the motion transmitting train along until the entire device is returned to the portion shown in FIGS. 1 to 3.

It will be appreciated that an upward or clockwise movement of the stick 5 through an angle smaller than the angle α will cause a rectlinear downward movement of the piston 31 over less than its full stroke 58. A downward or counterclockwise movement of the stick 5 causes the piston 31 and the lug 57 to move upwardly over a distance commensurate with the angular displacement of the stick in a manner obvious from the preceding description of the opposite movement.

While the stick 5 swings in the plane of FIG. 1, the center of rotation of the non-illustrated ball joint connecting the arm 14 with the linking rod 18 remains stationary, and the actuator 29 is inactive. When the stick 5 is swung in a horizontal plane perpendicular to that of FIG. 1, the actuator 29 moves the associated lug while the actuator 28 remains in the inactive or neutral position. When the stick 5 is moved in a plane obliquely inclined to that of FIG. 1, both actuators move in the associated motion transmitting trains to cause a movement of the non-illustrated work piece in a direction which is oblique to both afore-mentioned paths of the same.

It has been found that machine operators very quickly learn precisely to shift and position work pieces by means of the illustrated control mechanism which requires but one hand. Regardless of the ultimate position of the work piece and of the control stick 5, the control stick is returned by the two springs 54 in the actuators 28, 29 to its initial neutral position, and the work piece is correspondingly returned to its starting position by the pressure of the hydraulic fluid.

Figure 4:
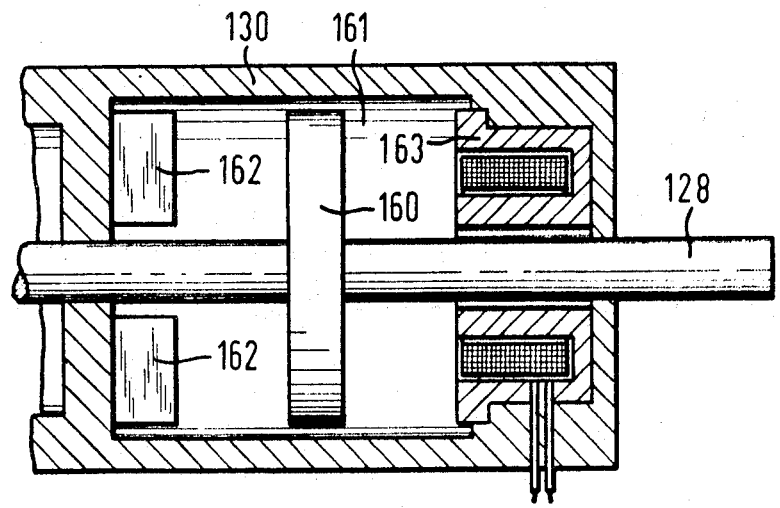
FIGS. 4 and 5 illustrate respective modifications of the apparatus of FIGS. 1 to 3 in fragmentary, enlarged, sectional views analogous to that of FIG. 3.

FIG. 4 shows a modification of the apparatus of FIGS. 1 to 3 which permits the workpiece to be arrested in a position remote from its starting position in the direction of one of its paths without interferring with workpiece movement in the direction of the other paths. FIG. 4 shows only as much of the modified actuator 28 as is necessary for an understanding of the arresting mechanism.

While the apparatus seen in FIG. 3 is practically entirely constructed of steel, the control rod 128 and the actuator shell 130 are made of brass, aluminum or other non-magnetic material. The non-ferrous control rod 128 carries a collar 160 of soft iron or similar magnetizable material. An annular electromagnet 163 is mounted on the lower end wall of the chamber 161 in the shell 130 in which the collar 160 is normally held axially centered by a spring and spring retainers in the manner shown in FIG. 3, but omitted from FIG. 4 for the sake of clarity. The coil of the electromagnet 163, the afore-mentioned switch 10, and a source of electric current, not shown, are arranged in series circuit so that the magnet is energized as long as the button 9 is pressed. The internal flange of the shell 130 carries permanent magnets 162 opposite the collar 160.

The magnets 162, 163 are selected to hold the control rod 128 in either of its terminal positions against the biasing force of the spring 54. The permanent magnets 162 release the control rod when adequate pressure is applied to the stick 5, and the electromagnet 163 permit the control rod to return to its neutral position under spring pressure when the button 9 is released. It will be appreciated that the device shown in FIG. 4 is capable of many variations and modifications as conditions may require. An arresting magnet may thus be provided only at one side of the collar 160, and it may be either a permanent magnet or an electromagnet. Obviously, both magnets in the arrangement of FIG. 4 may be either permanent magnets or electromagnets. Also, the magnetic arresting mechanism may be separated from the biasing spring arrangement and arranged in a separate chamber.

Figure 5:
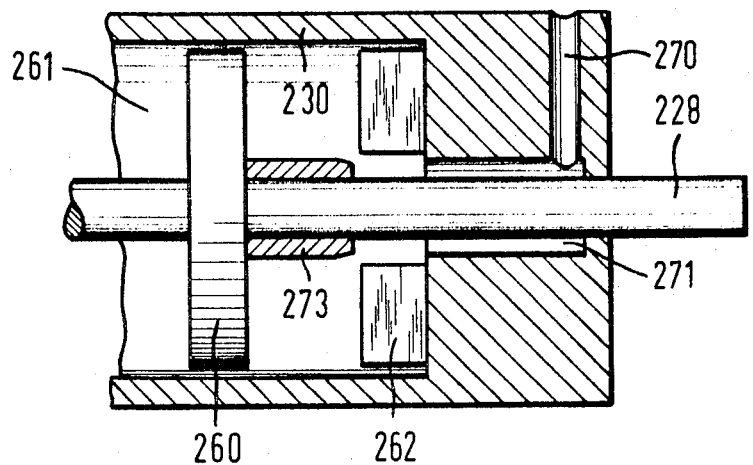

Such a modification is shown in FIG. 5. A chamber 230 is attached to the bottom of the actuator shell 30, not itself seen in FIG. 5, and a non-ferrous portion 228 of the control rod 26 passes through the chamber and carries an iron collar 260 as an armature for an annular permanent magnet 262. The magnet spacedly envelops a valve seat about an oversized bore 271 receiving the control rod portion 228. The rod portion 228 carries a tubular valve member 273 which engages the valve seat about the orifice of the bore 271 when the armature is held by the magnet 262, and blocks fluid flow from the bore 271 into the chamber 230. A duct 270 leads outward from the bore 271. It may be connected with a compressed air line, and the valve 273 together with the control rod 228 moved axially away from the valve seat toward the illustrated position by a pulse of compressed air admitted to the duct 270 and of a strength sufficient to overcome the attraction of the magnet 262 on the armature 260.

The arresting devices shown in FIGS. 4 and 5 are free from parts which wear during normal use, and are therefore capable of extended use without need for maintenance. As may be required, arresting mechanisms may be provided for one or both actuators, or for more if more than two actuators are provided and controlled by respective arms on the control stick 5.

It should be understood, therefore, that the foregoing description relates only to a preferred embodiment of the invention and to partial modifications thereof chosen for the purpose of the disclosure, and that it is intended to cover all modifications and variations of the illustrated examples of the invention which do not depart from the spirit and scope of the invention as set forth in the appended claims.

What is claimed is:

1. Apparatus for simultaneously and independently controlling movements of two motion transmitting elements comprising, in combination:
   (a) a support;
   (b) a control member;
   (c) a first universal joint connecting said control member to said support for universal angular movement including movement in each of two intersecting planes toward and away from a neutral position;
   (d) two arms mounted on said control member and extending from the same transversely of said planes rspectively;
   (e) a second universal joint and a third universal joint mounted on said arms respectively;
   (f) two actuator means for respectively causing said movements of said motion transmitting elements; and
   (g) linkage means secured to each of said second and third universal joints and respectively connecting said arms to said actuator means for controlling the same in response to movement of said arms:
      (1) each of said linkage means including biasing means for biasing said control member toward said neutral position, at least one of said linkage means including an elongated rod member longitudinally movable on said support,
      (2) said biasing means of said one linkage means including
         (i) a collar member fixed on said rod member,
         (ii) two fixed abutment members spaced from said collar member on said support longitudinally of said rod member in opposite directions,
         (iii) two movable abutment members,
         (iv) yieldably resilient means interposed between said movable abutment members and biasing the same toward said fixed abutment members respectively, and
         (v) claw means on each movable abutment member and engageable with said collar member for limiting relative movement of the movable abutment member and of the collar member away from each other,
         (vi) each of said movable abutment members being formed with a slot extending longitudinally of said rod member and movably receiving the claw means of the other movable abutment member during said relative movement, and
      (3) coupling means for coupling said rod member to the associated actuator means.

2. Apparatus as set forth in claim 1, wherein said universal joints have respective centers of rotation, the centers of rotation of said second and third universal joints being substantially equidistant from the center of rotation of said first universal joint.

3. Apparatus as set forth in claim 1, wherein said control member is elongated, and has a longitudinal axis, said universal joints have respective centers of rotation, and said centers of rotation are located substantially in a common plane perpendicular to said axis.

4. Apparatus as set forth in claim 3, wherein the centers of rotation of said second and third universal joints are offset 90° in said common plane relative to said axis.

5. Apparatus as set forth in claim 3, further comprising means for limiting angular movement of said control member about said axis.

6. Apparatus as set forth in claim 1, wherein said rod member has a longitudinal axis, and each of said movable members has a portion cylindrically arcuate about the last-mentioned axis and of the same radius of curvature, said cylindrically arcuate portions being formed with said slots.

7. Apparatus as set forth in claim 1, further comprising arresting means for arresting said control member in an angular position offset from said neutral position, said collar member being of magnetizable material and said arresting means including magnet means on said support for attracting said collar member.

8. Apparatus as set forth in claim 1, wherein said one linkage means includes arresting means for arresting said control member in an angular position offset from said neurtal position. said arresting means including an armature member of magnetizable material on said rod member and magnet means on said suport, said armature member moving toward said magnet means into an arresting position when said control member moves from said neutral position toward said offset angular position.

9. Apparatus as set forth in claim 8, wherein said magnet means includes a permanent magnet.

10. Apparatus as set forth in claim 8, wherein said magnet means includes an electromagnet.

11. Apparatus as set forth in claim 8, further comprising a source of fluid under pressure, and valve means movable with said armature member for blocking flow of fluid from said source in a blocking position of said valve means, the pressure of said fluid opposing the force of said magnet means in the blocking position of said valve means.

12. Apparatus as set forth in claim 8, wherein said source of fluid includes a valve seat member formed with an aperture, said rod member passing through said aperture and defining an annular passage with said valve seat member for flow of said fluid, said valve means including an annular valve member fixed on said rod member.

13. Apparatus as set forth in claim 12, said magnet means extending about said aperture and being spaced therefrom.

References Cited

UNITED STATES PATENTS

| | | | |
|---|---|---|---|
| 668,007 | 2/1901 | Capps | 74—582 |
| 2,705,971 | 4/1955 | Dorkins | 74—471 X |
| 2,930,360 | 3/1960 | Yando | 91—Dig. 4 |
| 3,013,531 | 12/1961 | Mueller | 91—Dig. 4 |
| 3,053,326 | 9/1962 | Derschmidt | 74—471 XY |
| 3,056,867 | 10/1962 | Eitel | 74—471 XY |
| 3,321,990 | 5/1967 | Densmore | 74—471 XY |

FOREIGN PATENTS

| | | | |
|---|---|---|---|
| 951,763 | 10/1956 | Germany | 74—471 |

MILTON KAUFMAN, Primary Examiner

U.S. Cl. X.R.

91—378; 267—15 D